US009236737B1

(12) United States Patent
Moan et al.

(10) Patent No.: US 9,236,737 B1
(45) Date of Patent: Jan. 12, 2016

(54) PRE-PROGRAMMED OUTPUT FOR DEMAND RESPONSE ELECTRICAL DEVICES

(75) Inventors: James Moan, Peachtree City, GA (US); Kenneth Walma, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 460 days.

(21) Appl. No.: 13/287,977

(22) Filed: Nov. 2, 2011

Related U.S. Application Data

(60) Provisional application No. 61/409,330, filed on Nov. 2, 2010.

(51) Int. Cl.
*G05D 25/02* (2006.01)
*H02J 3/00* (2006.01)

(52) U.S. Cl.
CPC ........................................ *H02J 3/00* (2013.01)

(58) Field of Classification Search
CPC .................................................... Y04S 20/222
USPC ...................... 700/19, 22, 286, 295; 340/2.24
See application file for complete search history.

(56) References Cited

U.S. PATENT DOCUMENTS

| | | | | |
|---|---|---|---|---|
| 4,360,881 | A * | 11/1982 | Martinson | 700/298 |
| 7,623,042 | B2 | 11/2009 | Huizenga | |
| 2004/0239244 | A1 * | 12/2004 | Brandes | 313/578 |
| 2005/0253538 | A1 * | 11/2005 | Shah et al. | 315/362 |
| 2006/0028997 | A1 * | 2/2006 | McFarland | 370/252 |
| 2006/0044152 | A1 * | 3/2006 | Wang | 340/825 |
| 2008/0122585 | A1 * | 5/2008 | Castaldo et al. | 340/286.01 |
| 2008/0272934 | A1 * | 11/2008 | Wang et al. | 340/870.11 |
| 2009/0267540 | A1 * | 10/2009 | Chemel et al. | 315/297 |
| 2010/0134051 | A1 * | 6/2010 | Huizenga et al. | 315/362 |
| 2010/0286841 | A1 * | 11/2010 | Subbloie | 700/295 |
| 2011/0006887 | A1 * | 1/2011 | Shaull et al. | 340/310.11 |

OTHER PUBLICATIONS

GE, "2008-2009_lamp_product_catalog.pdf", 2008.*
http://mashable.com/2009/12/05/augmented-reality-iphone/; 10 Amazing Augmented Reality iPhone Apps; Mashable.com; Dec. 5, 2009.

* cited by examiner

*Primary Examiner* — Mohammad Ali
*Assistant Examiner* — Yuhui R Pan
(74) *Attorney, Agent, or Firm* — King & Spalding LLP (57) ABSTRACT

A method is described herein for adjusting energy consumption of a pre-programmed device operating at a first energy level. The method includes receiving a first signal from a first utility signal that includes first instructions to adjust the energy consumption of the pre-programmed device to a second energy level. The pre-programmed device is programmed during manufacturing to operate at the first energy level and the second energy level. The method further includes processing the first signal to retrieve the instructions. The method also includes adjusting an energy source from the first energy level to the second energy level based on the first instructions. The method also includes sending a first notification to the first utility confirming that the pre-programmed device is operating at the second energy level.

20 Claims, 9 Drawing Sheets

PRE-PROGRAMMED OUTPUT FOR DEMAND RESPONSE ELECTRICAL DEVICES

CROSS-REFERENCE TO RELATED APPLICATIONS

This application claims priority under 35 U.S.C. §119 to U.S. Provisional Patent Application Ser. No. 61/409,330, titled "Pre-Programmed Output for Demand Response Electrical Devices" and filed on Nov. 2, 2010, the entire contents of which are hereby incorporated herein by reference.

TECHNICAL FIELD

The present disclosure relates generally to electrical devices and more particularly to systems, methods, and devices for making and communicating with a device or system to reduce the amount of power being used by that device or system.

BACKGROUND

Many individually addressable lighting control solutions currently offer control of lighting for demand response purposes where specific lighting or power levels can be defined for individual fixtures, groups of fixtures, or control devices once they are installed. However, because these devices include a microprocessor and need to be given a digital address to respond to commands, significant commissioning time and services are required upon installation in order to set the desired control output when a demand response signal is received. This commissioning usually requires someone to first locate the desired node by flashing a fixture or light emitting diodes (LEDs) on a light fixture or lighting device, naming the device, and then storing the device address in a database in order to ultimately use that device in a control algorithm. The level of technician typically required to complete the commissioning has a different skill set than that of the person installing the lighting fixture. Therefore, two different people are typically necessary to complete the installation and programming of the lighting fixtures. This additional commissioning increases the amount of cost, time, and coordination, which may result in a significant barrier to the adoption of demand response for such devices and controls.

Further, a utility (defined below) may encourage or sponsor a demand response program to a consumer. In such a case, the utility may periodically require an audit be conducted to verify devices (e.g., the existence of the connectivity thereof, the operating parameters thereof, the operating compliance thereof) that are controlled for the demand response program. Auditing such devices takes time and adds costs, which may also result in a significant barrier to the adoption of demand response for such devices and controls.

SUMMARY

In general, in one aspect, the disclosure relates to a method for adjusting energy consumption of a pre-programmed device operating at a first energy level. The method can include receiving a first signal from a first utility, where the first signal can include first instructions to adjust the energy consumption of the pre-programmed device to a second energy level, and where the pre-programmed device can be programmed during manufacturing of the pre-programmed device to operate at the first energy level and the second energy level. The method can also include processing the first signal to retrieve the instructions. The method can also include adjusting an energy source from the first energy level to the second energy level based on the first instructions. Further, the method can include sending a first notification to the first utility that confirms that the pre-programmed device is operating at the second energy level, where the first energy level and the second energy level of the pre-programmed device are typically unalterable by a customer after the manufacturing, and where the customer is typically unable to add a third energy level to the pre-programmed device after the manufacturing.

For another aspect, the disclosure can generally relate to a system for adjusting energy consumption in a pre-programmed device. The system can include a utility configured to send a signal. The signal can include instructions to adjust the energy consumption of the pre-programmed device from a first energy level and a second energy level. The system can also include a domain that includes the pre-programmed device operating at the first energy level, an energy source, and a controller. The energy source can be operatively coupled to the pre-programmed device and configured to adjust the energy consumption for the pre-programmed device between the first energy level and a second energy level, where the first energy level and the second energy level are programmed when the pre-programmed device is manufactured. The controller can be operatively coupled to the utility and the energy source. The controller can be configured to receive the signal from the utility that can include instructions to adjust the energy consumption of the pre-programmed device to the second energy level, process the signal to retrieve the instructions, adjust the energy source from the first energy level to the second energy level based on the instructions, and send a notification to the utility to confirm that the pre-programmed device is operating at the second energy level. In the system, the first energy level and the second energy level of the pre-programmed device can be unalterable by a customer after the pre-programmed device is manufactured, and the customer can be prevented from adding a third energy level to the pre-programmed device after the manufacturing.

For yet another aspect of the invention disclosure a computer readable medium can be provided for storing instructions for completing a process of adjusting energy consumption in a pre-programmed device operating at a first energy level. The method can include receiving a signal from a utility that can include instructions to adjust the energy consumption of the pre-programmed device to a second energy level, and where the pre-programmed device can be programmed during manufacturing of the pre-programmed device to operate at the first energy level and the second energy level. The method can further include processing the first signal to retrieve the instructions and adjusting, based on the first instructions, an energy source from the first energy level to the second energy level. The method can also include sending a first notification to the first utility that confirms that the pre-programmed device is operating at the second energy level, where the first energy level and the second energy level of the pre-programmed device can be configured to be unalterable by a customer after the manufacturing, and where the customer can be unable to add a third energy level to the pre-programmed device after the manufacturing.

These and other aspects, objects, features, and embodiments will be apparent from the following description and the appended claims.

BRIEF DESCRIPTION OF THE DRAWINGS

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXEMPLARY EMBODIMENTS

Exemplary embodiments of the invention will now be described in detail with reference to the accompanying figures. Like elements in the various figures are denoted by like reference numerals for consistency.

In the following detailed description of the exemplary embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, the exemplary embodiments described herein provide systems, methods, and devices for designing, manufacturing, and operating a demand response system for devices that use one or more forms of energy. More specifically, the exemplary embodiments provide for adjusting energy consumption of one or more devices that use energy based two-way communication between a utility and a controller associated with a device.

While the exemplary embodiments discussed herein are with reference to the use of demand response in lighting fixtures and other lighting applications, the systems, methods, and devices can also be incorporated into other electrical devices that use electrical energy, including but not limited to heating, ventilation, and air conditioning (HVAC) systems, water heaters, washing machines, dryers, dishwashers, and televisions. In addition, the systems and methods disclosed herein can also be incorporated and operated in other non-electrically oriented devices, such as water-based devices (e.g., sprinkler systems, shower heads, dishwashers, water valves), gas-based systems (e.g., gas valves, gas operated water heaters, boilers, heating systems, dryers), or any other system or set of devices using an energy source.

Demand response is the ability for a utility or other operator to send out a signal or command to one or more controllers that directs the controllers to change the operating characteristics of one or more devices that use energy. In other words, demand response allows a utility to control an amount of energy (e.g., electricity, natural gas, gasoline, propane, liquefied natural gas, water, fuel oil, heating oil, compressed air) used by one or more devices on a real-time basis by controlling the devices that use such energy. A change in operating characteristics may include, but is not limited to, "cutting off" (i.e., terminating) energy to a device, reducing an amount of energy to a device (e.g., dimming a light, lowering a fan setting), increasing an amount of energy to a device, returning an amount of energy to a previous energy level used by a device (e.g., an energy level used by a device prior to a signal to reduce energy consumption by a device), and turning on a device.

A demand response program may be any type of program, whether formal or informal, that a utility coordinates to utilize and/or encourage demand response behavior using one or more elements within a customer's domain. For example, if the utility is an electric service provider, the demand response program may be a formal program that allows the utility to remotely adjust energy consumption of devices in a home or business. As another example, if the utility is a customer, the demand response program may be an informal program where the utility may be attempting to, for example, conserve energy, reduce costs, reduce an environmental footprint, and/or improve security.

In one or more exemplary embodiments, a customer may participate in a demand response program offered by a utility. A customer may be any entity with one or more devices that uses an energy source. For example, a customer may be, but is not limited to, a person, a family, a business, or a government entity. In one or more embodiments, the customer is the same entity as the utility.

Figure 1A:
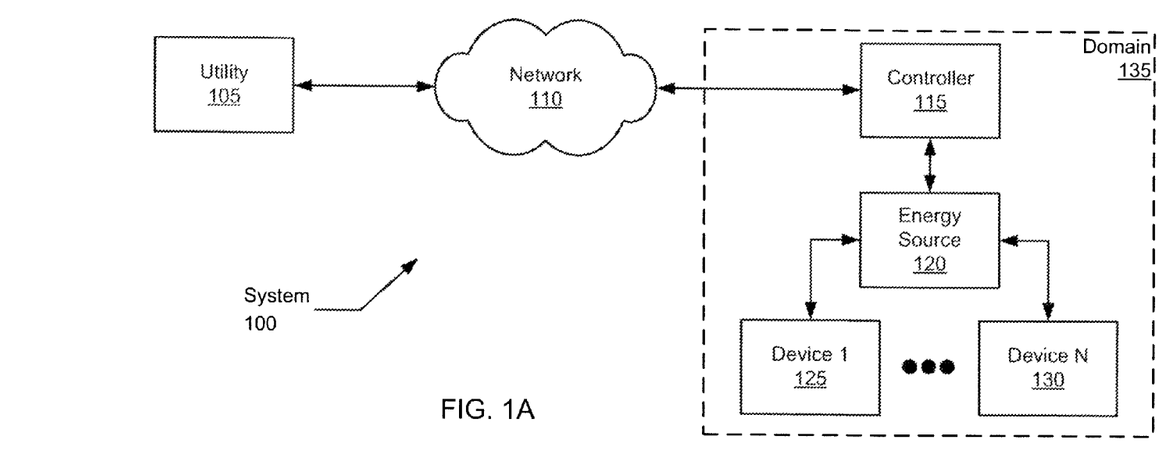
FIG. 1A shows a system in accordance with one or more exemplary embodiments of the present invention.

FIG. 1A shows a diagram of a system 100 in accordance with one or more exemplary embodiments. The system 100 includes a utility 105, a network 110, a controller 115, an energy source 120, and a number of devices (e.g., device 1 125, device N 130). The controller 115, the energy source 120, and the number of devices (e.g., device 1 125, device N 130) are located within a domain 135. Each of these components is described below. Embodiments of the invention are not limited to the configuration shown in FIG. 1A and discussed herein.

In one or more exemplary embodiments, the utility 105 is any entity that provides one or more forms of energy to one or more customers. Further, the utility 105 may support a demand response program for its customers to manage such energy on a real-time, system-wide basis. A utility may include, but is not limited to, an investor-owned utility, an electric service provider, a gas distributor, a municipality, a cooperative, an owner of a manufacturing facility, a customer, an aggregator, an energy auditor, an energy manager (as for a building), a certifying authority, an energy retailer, and a building manager.

To manage energy under a demand response program, the utility 105 may send a signal to one or more controllers 115 using the network 110. In one or more exemplary embodiments, a signal (also sometimes referred to as a demand response signal) is an electronic communication providing an instruction, command, request, and/or information. The signal sent by the utility 105 may be related to controlling an amount of energy used by one or more devices (e.g., device 1 125, device N 130) controlled by the controller 115. In one or more exemplary embodiments, the signal includes various information, including, but not limited to, identification of a specific device or type of device, identification of a specific controller or type of controller, a different level of energy that the device is to consume, timing (start time, duration, and/or end time) with regard to the different level of energy consumed by the device, a priority level of the signal, and/or identification of the utility as sender of the signal.

For example, the utility 105 may be a local electric distribution company (DISCo), and the signal may be sent at 9:00 a.m. to identify the DISCo and command that all outdoor lights at 6247 Carpathian Court in West Bloomfield, Mich. be turned off immediately. As another example, the utility 105 may be a cooperative, and the signal may be sent at 3:00 a.m. to identify the cooperative and command that all outdoor lights at 6247 Carpathian Court in West Bloomfield, Mich. be turned off between the hours 9:00 a.m. and 4:00 p.m. for that day.

In one or more exemplary embodiments, the utility 105 is also configured to receive one or more signals from the controller 115 through the network 110. For example, the utility 105 may receive a signal from the controller 115 notifying the utility 105 that an instruction sent by the utility 105 has been executed. As another example, the utility 105 may receive a signal disclosing an amount of power currently used by a particular device.

In one or more exemplary embodiments, more than one utility 105 may communicate with the controller 115 through the network 110 (and/or other networks). For example, to communicate with a controller 115 used in a demand response program to control the amount of power delivered to lights in a residential home, three different utilities may be the homeowner, the local electric distribution company, and a regional transmission operator.

In one or more exemplary embodiments, the network 110 is any combination of hardware and/or software that allows signals to be sent between the utility 105 and the controller 115. The network 110 may be wireless, hardwired, or any suitable combination thereof. The network 110 may follow one or more communication protocols to allow the signals to be sent between the utility 105 and the controller 115. Examples of such protocols include, but are not limited to, WI-FI, zigbee, z-wave, 61oWPAN, 900 MHz flex paging, and general packet radio service (GPRS).

In one or more exemplary embodiments, the controller 115 is configured to receive, process, and, if applicable, perform actions required by a signal received from the utility 105 through the network 110. The controller 115 may include hardware and/or software to perform its functions. The controller 115 may be configured to automatically receive a signal from the utility 105, regardless of when or how often the utility sends a signal. In one or more exemplary embodiments, the controller 115 processes the signal to retrieve the instructions sent by the utility 105 for demand response.

The controller 115 may be in communication with (e.g., receive signals from) more than one utility 105 at one time, where each utility 105 uses the same or different communication protocols. In such a case, the controller 115 may respond to signals received from multiple utilities for controlling the same device according to a hierarchy. Such a hierarchy may be programmed into the controller 115 during manufacturing of the controller 115 or at some point in time after manufacturing by an entity (e.g., customer, contractor, installer). For example, a signal received by the controller 115 from an electric distribution company may override a signal from a customer that is currently being acted upon by the controller 115. Subsequently, an emergency signal received by the controller 115 from a regional transmission operator may override the signal from the electric distribution company.

The controller 115 may further be configured to automatically receive and respond to a signal from the utility 105 immediately upon installation of the controller 115. The controller 115 may also be configured to send a request for a signal. Such a request may be sent to a particular utility 105 or to multiple utilities in cases where the controller 115 recognizes multiple utilities. In one or more exemplary embodiments, the controller 115 is also configured to send a signal to the utility 105. Such a signal may be a request, a confirmation, a notification, and/or any other appropriate type of communication with the utility 105. The signal sent by the controller 115 to the utility 105 may be through the network 110 or through some other network. The protocols used by the controller 115 to send a signal to the utility 105 may be the same as the protocols used by the utility 105 to send a signal to the controller 115.

In one or more exemplary embodiments, the controller 115 is further configured to detect and communicate with (wirelessly and/or through hardwire connections) one or more devices (e.g., device 1 125, device N 130) and/or one or more energy sources (e.g., energy source 120) associated with a device within the domain 135. By detecting and communicating with the one or more devices and/or energy source, the controller 115 may identify the device(s) and/or energy source(s) currently connected within the domain 135, the device(s) and/or energy source(s) that are currently active (and inactive) within the domain 135, and any devices and/or energy sources added to the domain 135. By identifying a device and/or energy source, the controller 115 may determine the type of device (e.g., lighting, water heater), the pre-programmed operating parameters (defined below) of the device and/or energy source, and/or any other information associated with the device used for demand response of the device with the utility 105. The controller 115 may detect and communicate with a device (e.g., device 1 125, device N 130) and/or an energy source (e.g., energy source 120) upon installation of the controller 115 and/or upon installation of the device and/or energy source.

In one or more exemplary embodiments, the controller 115 is further configured to control and/or modify an amount of energy delivered to one or more devices (e.g., device 1 125, device N 130). Specifically, the controller 115 may be configured to adjust the energy source 120 for the one or more devices (e.g., device 1 125, device N 130) to control and/or modify an amount of energy delivered to one or more devices. The amount of energy delivered to the one or more devices by the controller 115 may be based on a signal received from the utility 105. The controller 115 may further be configured to monitor, either continually or periodically, an amount of energy delivered to one or more devices.

The controller 115 may be integrated with, or separate from, the energy source 120 and/or a device (e.g., device 1 125, device N 130). When the controller 115 is physically separate from the energy source 120, then the controller 115 may be configured to communicate with the energy source 120 in a manner appropriate to the configuration and conditions. For example, if the controller 115 is a whole-house controller that is located in the kitchen of a residential home and controls every device in the home that uses electricity, water, propane, and natural gas, then the controller 115 is configured with the appropriate hardwire and/or wireless equipment to communicate with every energy source 120 on the property at any time. In such a case, the controller 115 may include a battery-backup system or uninterruptible power supply to remain constantly available to the energy source 120 and/or the utility 105.

In one or more exemplary embodiments, the controller 115 is marketed and sold with guidelines as to where to locate the controller 115, or the energy source 120 and/or device (e.g., device 1 125, device N 130) electrically coupled thereto. The location of the controller 115 relative to the energy source 120 and/or device may be based on one or more of a number of factors, including but not limited to the amount of energy reduction for which the controller 115 is pre-programmed, the method for communicating between the elements, and relative the distance between elements. Information accompanying the controller 115 may also describe another energy source 120 and/or other devices (e.g., device 1 125, device N 130) that the controller 115 may be used to control within the domain 135 under a demand response program. In such a case, the controller 115 may require manual configuration under a retrofit installation or may automatically communicate with and control.

In one or more exemplary embodiments, the controller 115 is further configured to communicate with the customer. Specifically, the controller 115 may include a means of notifying the customer of any demand control actions being taken at a point in time. The means of notification may be a display, a file, a print-out, a text message, some other type of notification, or any combination thereof. The notification may include information associated with a demand control action, including but not limited to the utility exercising the demand control, the level of demand control being exercised, the start time of the demand control action, the projected end time of the demand control action, and/or the duration of the demand control action. The communications delivered by the controller 115 to the customer may be dynamically delivered or updated on a periodic basis. Further information about the output capability of the controller 115 with respect to the customer may be found in U.S. patent application Ser. No. 12/762,021 entitled "Occupancy Sensor with Energy Usage Indicator" to Matthew Conger et al. filed on Apr. 16, 2010, which is hereby incorporated by reference in its entirety.

In one or more exemplary embodiments, the energy source 120 provides variable amounts of energy to one or more devices (e.g., device 1 125, device N 130) controlled by the controller 115. The energy source 120 may be separate from, or integrated with, the controller 115 and/or one or more device. Multiple energy sources may be controlled by the controller 115, where the multiple energy sources may deliver the same or different types (e.g., electricity, natural gas, water) of energy to one or more devices. Examples of an energy source 120 include, but are not limited to, a battery, a control module, an LED driver, a microprocessor, a ballast, a valve, a thermostat, a manual wall switch controller, a resistor, a switch, and a rheostat.

In one or more exemplary embodiments, the controller 115 and/or the energy source 120 have pre-programmed settings (also called demand response settings) at which energy is used by the device. For example, the controller 115 and/or the energy source 120 of the device may have one or more non-adjustable demand response settings that are installed at the point of manufacture. In such a case, the energy levels of the pre-programmed device are unalterable by a customer after the manufacturing. Further, the customer may be unable to any other energy levels to the pre-programmed device after the device has been manufactured.

One or more demand response settings may also be added after the manufacturing process (e.g., by an installer/contractor, by the consumer). Alternatively, the controller 115 and/or the energy source 120 may be configured so that no demand response settings can be added after the manufacturing process. The energy source 120 may be integrated with, or separate from, the controller 115 and/or a device (e.g., device 1 125, device N 130).

For example, if the energy source 120 is a fixture module for a stock-keeping unit (SKU) of light fixtures 115, the fixture module may have a pre-programmed (i.e., programmed during manufacturing of the controller, energy source, and/or associated device) demand response setting of 50%. In such a case, energy source 120 for the light fixture and/or the controller 115 (which may be sold separately or sold as a single unit with the energy source and device) may be identified (physically and/or electronically) with a model number that identifies the amount of energy reduction that may be achieved with the controller 115, such as including "−50" in the model number. Continuing with this example, another SKU of the light fixtures having a fixture module with a different pre-programmed demand response can reduce the energy consumption of the light fixtures by (or to) 20%. In such a case, the light fixture and/or the controller 115 (which may be sold separately or sold as a single unit with the energy source and device) may be marketed with a model number that identifies the amount of dimming or power reduction that will be achieved with the controller, such as including "−20" in the model number. Similarly, other output designations (e.g., "−100" for fully on, "−OFF" or "0" for fully off, and/or any other number between "100" and "0") may be used in the model number of the controller 115, energy source 120, and/or device.

The controller 115, energy source 120, and/or device may be configured to have more than one output designation (aside from "100" and "0"). Further, the controller 115, energy source 120, and/or device may have multiple output designations in increments, such as every 5% or every 10% between "100" and "0". For example, a model number may end in "40%" (e.g., HAL-68428-4-40%) to show that the device (which includes the controller 115 and the energy source 120) has energy output levels at 0%, 40%, and 100%. As another example, a model number may end in "20% i" (e.g., LED2-3574-20% i) to show that the device (which includes the controller 115 and the energy source 120) has energy output levels at 0%, 20%, 40%, 60%, 80%, and 100%.

The controller 115, energy source 120, and/or device may also be configured to have a designation that describes a time element. The time element may be used with any non-instantaneous demand response command associated with a signal. For example, the time element may describe an ability to delay the start of a demand response command, to specify a particular start time at which a demand response command is to be implemented, a duration for which a demand response command is to be implemented, and/or an end time to which a demand response command is to be terminated. In such a case, a model number may end in "t" (e.g., HAL7-9247-8-35% i) to show that the device (which includes the controller 115 and the energy source 120) has the capability of interpreting a time element that accompanies a signal to implement a demand response command. An example of a model number is described below with regard to FIG. 1B.

For multiple energy sources in a domain 135, each energy source 120 may be configured to respond to the same signal (e.g., command) from the utility 105, or each energy source 120 can wait for a different command based on the specific pre-programmed traits of the energy source 120 and/or the particular device(s) associated with the energy source.

In one or more exemplary embodiments, a device (e.g., device 1 125, device N 130) is any product or service that uses one or more forms of energy delivered by the energy source 120. Each device may be configured to receive and operate on variable amounts of energy. Examples of a device include, but are not limited to, a light (e.g., light emitting diode (LED), incandescent, fluorescent, halogen) fixture, a dishwasher, a clothes washer, a dryer, a water heater, an HVAC system, a sprinkler system, a pump, and a water heater. A device may be integrated with, or separate from, the controller 115 and/or the energy source 120. A light fixture may be a lamp (e.g., one or more lightbulbs such as an LED light bulb with integral driver), a LED driver, or any similar lighting device.

In one or more exemplary embodiments, the domain 135 is a boundary within which one or more controllers, one or more energy sources, and one or more devices are contained. The domain 135 may be an actual boundary (e.g., a building, a light fixture, a piece of property) or a virtual boundary. The domain 135 may apply to a single device (which includes the controller 115 and the energy source 120) or multiple devices and/or multiple controllers and/or multiple energy sources.

Figure 1B:
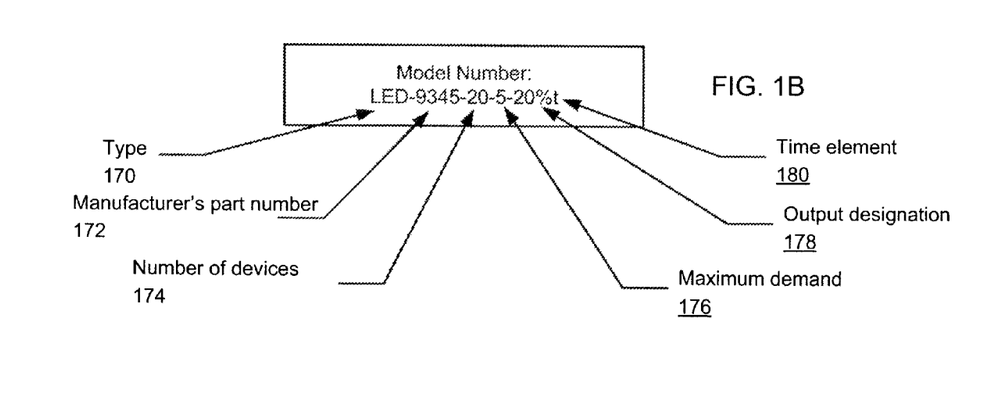
FIG. 1B shows an example model number for a device in accordance with one or more exemplary embodiments of the present invention.

FIG. 1B shows an example model number for a device in accordance with one or more exemplary embodiments. In FIG. 1B, the model number of a device (which may include the controller 115 and/or the energy source 120) is shown to have several components. Specifically, the model number includes a type 170, a manufacturer's part number 172, a number of devices 174, a maximum demand 176, an output designation 178, and a time element 180. Each of these components is described below. Embodiments of the invention are not limited to the configuration shown in FIG. 1B and discussed herein. In other words, a model number for a device may have different components, order of components, and designations than those described herein.

The far left component of the model number shown in FIG. 1B is the type 170, shown in this example as "LED." The type 170 may describe the type of device, the manufacturer, and/or other some other aspect of the device. The next component of the model number is the manufacturer's part number 172, which may be used, for example, for inventory, ordering, and/or parts computability. The number of devices 174 may display the number of units (in this case, the number of LEDs) controlled by the controller associated with this device. In this example, the controller of the device controls 20 LEDs.

The maximum demand 176 may show the maximum demand of the device. In other words, the maximum demand 176 shows the instantaneous amount of energy consumed by the device when the device operates at 100%. The units of the maximum demand 176 may be in watts, kilowatts, British thermal units, gallons, cubic feet, or some other appropriate designation.

The output designation 178 may show, as described above, the amount of energy to which (or by which) the device may be reduced in terms of energy output. In this case, the output designation 178 is 20%. In other words, the device may have a setting to reduce energy consumption by 20%. Alternatively, the device may have a setting to have an energy output of 20%. The time element 180, if any, is denoted by "t" and allows for a non-instantaneous implementation of a demand response command, as described above.

Figure 2:
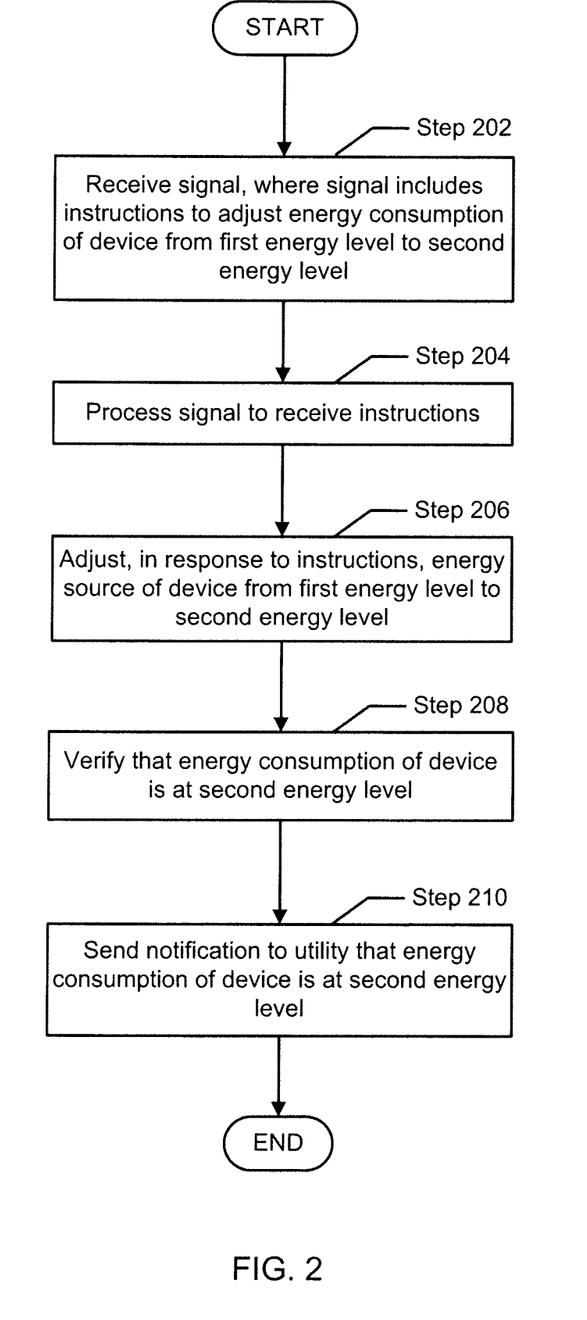
FIG. 2 shows a flowchart of a method in accordance with one or more exemplary embodiments of the invention.

FIG. 2 shows a flowchart of a method for reducing energy consumption in a device in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps, omitted in FIG. 2, may be included in performing this method. Accordingly, the specific arrangement of steps shown in FIG. 2 should not be construed as limiting the scope. Further, in one or more exemplary embodiments, a particular computing device, as described, for example, in FIG. 3 below, is used to perform one or more of the method steps described herein.

In Step 202, a signal is received from a utility. In one or more exemplary embodiments, the signal includes instructions to adjust the energy consumption of a device from a first energy level to a second energy level. The device may be programmed, during manufacture of the device, to operate at the first energy level and the second energy level. The signal received from the utility may be received substantially instantaneously from when the utility sent the signal. Alternatively, the signal received from the utility may be received some amount of time after the utility sent the signal. The signal may identify a specific device and an associated energy source. The signal may be received using one of a number of communication protocols.

In Step 204, the signal is processed. The signal may be processed by converting the language of the signal into a readable format. The signal may also be processed by determining one or more components of the signal. A component may include, for example, identifying information for the device to be controlled, the first energy level of the device, and the second energy level of the device. Other components may include a start time at which the second energy level is to be implemented, a duration for which the second energy level is to be implemented, an end time to which the second energy level is to be implemented, and/or instructions for after the end time of the second energy level is implemented.

In one or more embodiments, the signal may include a command that conflicts with a command, based on a previously-received signal, currently being exercised on a device. For example, an initial signal received may have required that the energy level of the device be reduced from 100% to 50%. While the initial signal is in force (i.e., while the device is operating at 50%), a subsequent signal may require that the device be turned off (i.e., the energy level of the device is reduced to 0%). In such a case, where more than one source (i.e., utility) is sending signals that impact the energy consumption of a device, a hierarchy may be developed, so that a signal received from one source may be ignored in favor of a signal received from a different source. The hierarchy may be determined in advance of receiving the signals (for example, based on the authority of each utility relative to each other). The hierarchy may also be determined based on the signal. In the latter case, for example, a portion of the signal may designate that an emergency is involved and takes precedent over all other signals directed to the device, regardless of the source.

In Step 206, the energy source of the device is adjusted from the first energy level to the second energy level. In one or more exemplary embodiments, the energy source of the device is adjusted from the first energy level to the second energy level in a manner dictated by the configuration of the energy source. For instance, if the energy source of the device outputs a valve, the energy source is adjusted from the first energy level to the second energy level by adjusting the valve of the energy source so that the new valve of the energy source corresponds to the second energy level. For example, if the energy source is a LED driver used to control one or more LED lights (i.e., the devices) and if one of the settings created during manufacturing of the LED driver is a 20% output level, then, in response to the signal from the utility, the LED driver may reduce the energy level of the LED lights from 100% to 20%.

The first energy level may be greater than the second energy level (i.e., the energy consumption of the device decreases). Alternatively, the first energy level may be less than the second energy level (i.e., the energy consumption of the device increases). The device may use more than one form of energy (e.g., electricity, natural gas, gasoline, propane, liquefied natural gas, water, fuel oil, heating oil, compressed air). Thus, the energy source may be capable of being adjusted to control these one or more forms of energy. The energy source may be adjusted based on an electrical signal, a pressure, one or more software instructions, a passage of time, some other event, or any combination thereof.

In Step 208, the energy consumption of the device is verified as being at the second energy level. In one or more exemplary embodiments, the energy consumption of the device is verified using a metering device used to measure the amount of energy consumed by the device. The metering device may be used to directly or indirectly (e.g., use the reading of the metering device in a calculation) measure the amount of energy consumed by the device.

In Step 210, a notification is sent to the utility. In one or more exemplary embodiments, the notification notifies the utility that the device is operating at the second energy level. The notification may be sent to the utility in the same manner in which the signal was received from the utility. In one or more exemplary embodiments, the notification may be sent to all utilities capable of communicating with the device, not just the utility that sent the initial demand response signal.

Figure 3:
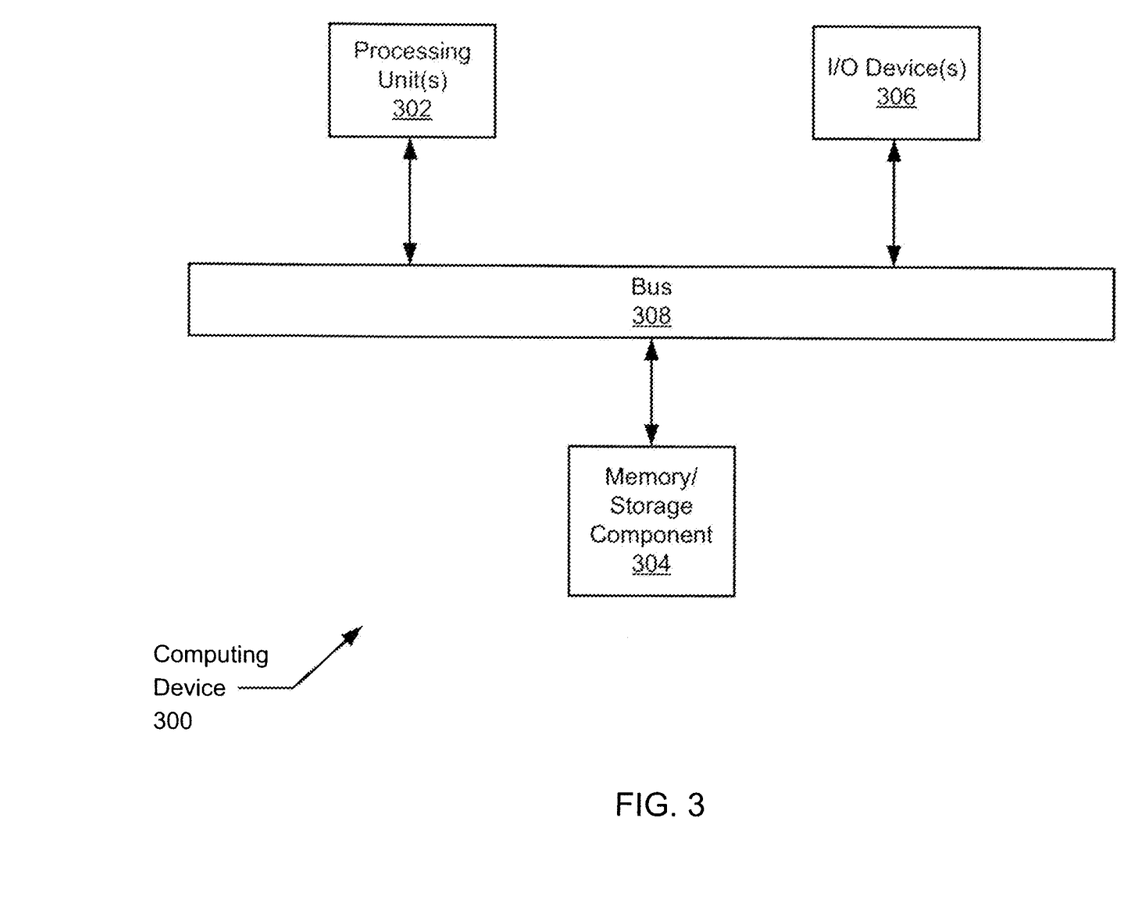
FIG. 3 shows a computing device in accordance with one or more exemplary embodiments of the invention.

FIG. 3 illustrates one embodiment of a computing device (300) that can implement one or more of the various techniques described herein, and which may be representative, in whole or in part, of the elements described herein. Computing device (300) is only one example of a computing device and is not intended to suggest any limitation as to scope of use or functionality of the computing device and/or its possible architectures. Neither should computing device (300) be interpreted as having any dependency or requirement relating to any one or combination of components illustrated in the example computing device (300).

Computing device (300) includes one or more processors or processing units (302), one or more memory/storage components (304), one or more input/output (I/O) devices (306), and a bus (308) that allows the various components and devices to communicate with one another. Bus (308) represents one or more of any of several types of bus structures, including a memory bus or memory controller, a peripheral bus, an accelerated graphics port, and a processor or local bus using any of a variety of bus architectures. Bus (308) can include wired and/or wireless buses.

Memory/storage component (304) represents one or more computer storage media. Memory/storage component (304) may include volatile media (such as random access memory (RAM)) and/or nonvolatile media (such as read only memory (ROM), flash memory, optical disks, magnetic disks, and so forth). Memory/storage component (304) can include fixed media (e.g., RAM, ROM, a fixed hard drive, etc.) as well as removable media (e.g., a Flash memory drive, a removable hard drive, an optical disk, and so forth).

One or more I/O devices (306) allow a customer, utility, or other user to enter commands and information to computing device (300), and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device (300) may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (300) includes at least the minimal processing, input, and/or output means necessary to practice one or more embodiments.

Further, those skilled in the art will appreciate that one or more elements of the aforementioned computer device (300) may be located at a remote location and connected to the other elements over a network. Further, one or more embodiments may be implemented on a distributed system having a plurality of nodes, where each portion of the implementation (e.g., controller 115, energy source 120) may be located on a different node within the distributed system. In one or more embodiments, the node corresponds to a computer system. Alternatively, the node may correspond to a processor with associated physical memory. The node may alternatively correspond to a processor with shared memory and/or resources.

The following description (in conjunction with FIGS. 1 through 3) describes an example in accordance with one or more exemplary embodiments. The example is for explanatory purposes only and is not intended to limit the scope. Terminology used in FIGS. 1 through 3 may be used in the example without further reference to FIGS. 1 through 3.

EXAMPLE

Figure 4A:
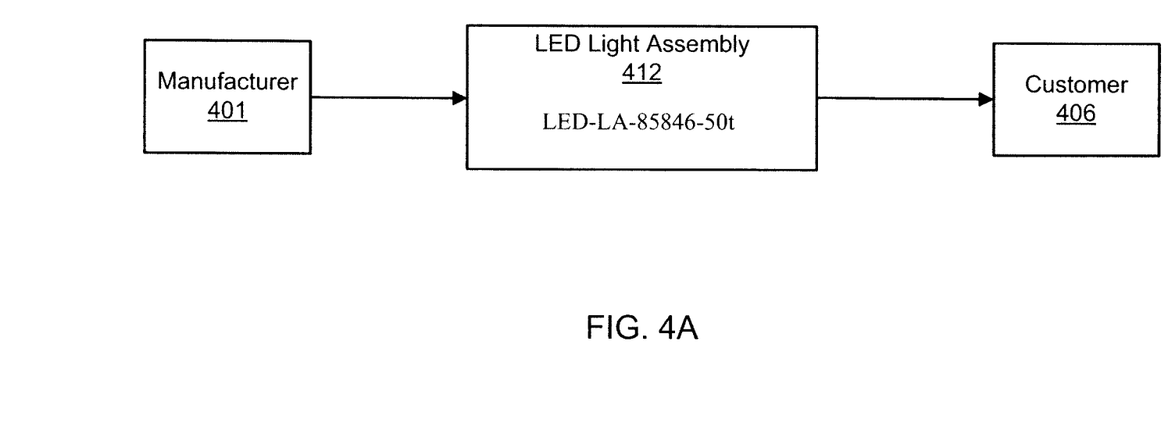
FIGS. 4A through 4F show an example in accordance with one or more exemplary embodiments of the invention.

Consider the following example, shown in FIGS. 4A through 4F, which describes adjusting energy consumption of a device in accordance with one or more embodiments described above. Initially, as shown in FIG. 4A, LED light assembly 412 is a pre-programmed device that is manufactured (including programming) by Manufacturer 401. As part of the manufacturing process, the LED light assembly 412 is programmed with three different operating levels (i.e., energy levels). Specifically, the LED light assembly 412 has a first energy level corresponding to 0% output, a second energy level corresponding to 50% output, and a third energy level corresponding to 100% output.

The LED light assembly 412 is then marketed and obtained by customer 406. The LED light assembly 412 is marketed such that the energy levels that are programmed into the LED light assembly 412 may be recognized by the customer 406.

In this example, the LED light assembly 412 has a model number of LED-LA-85846-50t, where the "−50" toward the end of the model number informs the customer 406 that the LED light assembly 412 may operate at 0% output, 50% output, or 100% output. The "t" at the end of the model number informs the customer 406 that the LED light assembly 412 may execute a demand response instruction on a time delay. The LED light assembly 412 is configured such that customer 406 is unable to alter the energy levels that were programmed into the LED light assembly 412 during manufacturing. Further, the LED light assembly 412 is configured such that customer 406 is unable to add an additional energy level to the LED light assembly 412.

Figure 4B:
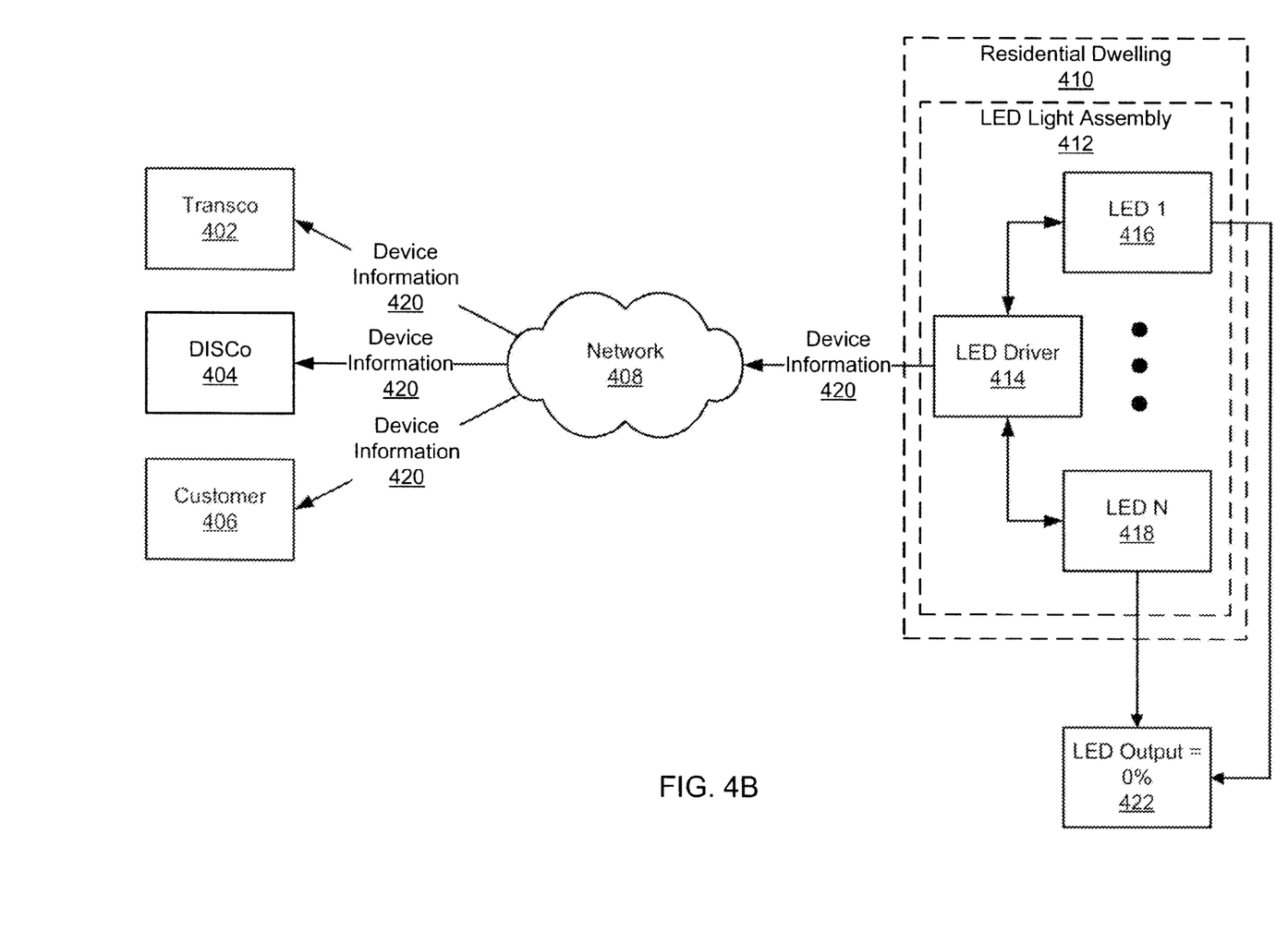

In FIG. 4B, customer 406 is a homeowner and installs the LED light assembly 412 in his home (i.e., residential dwelling 410). In the example, consider the scenario in which Transco 402, DISCo 404, and customer 406 are utilities, as shown in FIG. 4B. Transco 402 is a regional electric transmission operator delivering electricity over transmission lines for distribution to utilities such as DISCo 404. DISCo 404 is a local distribution company that delivers electricity to homes and businesses using electric distribution lines. Customer 406 lives in residential dwelling 410 that receives electric service from DISCo 404.

Each of Transco 402, DISCo 404, and customer 406 has a form of a demand response program. Transco 402 implements emergency procedures from time to time to prevent blackouts from occurring on the transmission grid. DISCo 404 offers a formal incentive program (a demand response program) for demand response to customers, such as customer 406, within DISCo's service territory. Customer 406, a participant in DISCo's demand response program and a conserver of energy, monitors and manages his electric usage throughout each day. DISCo's demand response program gives DISCo 404 the right to adjust certain electric devices in customer's residential dwelling 410 within certain parameters and under certain conditions. In return, customer 406 receives financial compensation from DISCo for participating in the demand response program.

Inside the residential dwelling 410 is the LED light assembly 412. The LED light assembly 412 includes a LED driver 414 that communicates with and provides controlled power to a number of LEDs (e.g., LED 1 416, LED N 418). A network 408 provides a communication link between elements within the residential dwelling 410 (e.g., the LED driver 414) and Transco 402, DISCo 404, and customer 406. When the LED light assembly 412 is initially installed, the LEDs are off. As a result, the LED output=0% 422, corresponding to the first energy level.

When the LED light assembly 412 is installed in the residential dwelling 410, the LED driver 414 communicates, through the network 408, with Transco 402, DISCo 404, and customer 406 to provide Transco 402, DISCo 404, and customer 406 with device information 420 about the LED light assembly 412. The device information 420 may be sent by the LED light assembly 412 in response to an inquiry from one or more of Transco 402, DISCo 404, and customer 406. Alternatively, the device information 420 may be sent automatically by the LED driver 414 to any and all utilities capable of receiving the device information 420.

The device information 420 gives device-specific information about the operating capabilities of the LED light assembly 412. Device information 420 may include, but is not limited to, the location (e.g., address, geographic coordinates) of the residential dwelling 410 in which the LED light assembly 412 is located, the manufacturing information (e.g., serial number, model number, identification number) of the LED light assembly 412, and the output settings (e.g., settings created during manufacturing) of the LED light assembly 412. For example, the device information 420 may include, at least, the model number of LED-LA-85846-50t, which identifies the manufacturer, the peak demand of the device, the capability to execute an instruction after a time delay, and the energy levels at which the device is capable of operating. The device information 420 may be sent according to one or more communication protocols through the network 408 so that all utilities (in this example, Transco 402, DISCo 404, and customer 406) are capable of receiving and understanding the device information 420.

In addition, the LED driver 414 establishes a hierarchy among the utilities with which it communicates so that multiple demand control signals that impact the same particular point in time can be acted upon and/or ignored appropriately. In this case, demand control signals received from Transco 402 take precedent over demand control signals received from DISCo 404, which both take precedent over demand control signals received from the customer 406.

Figure 4C:
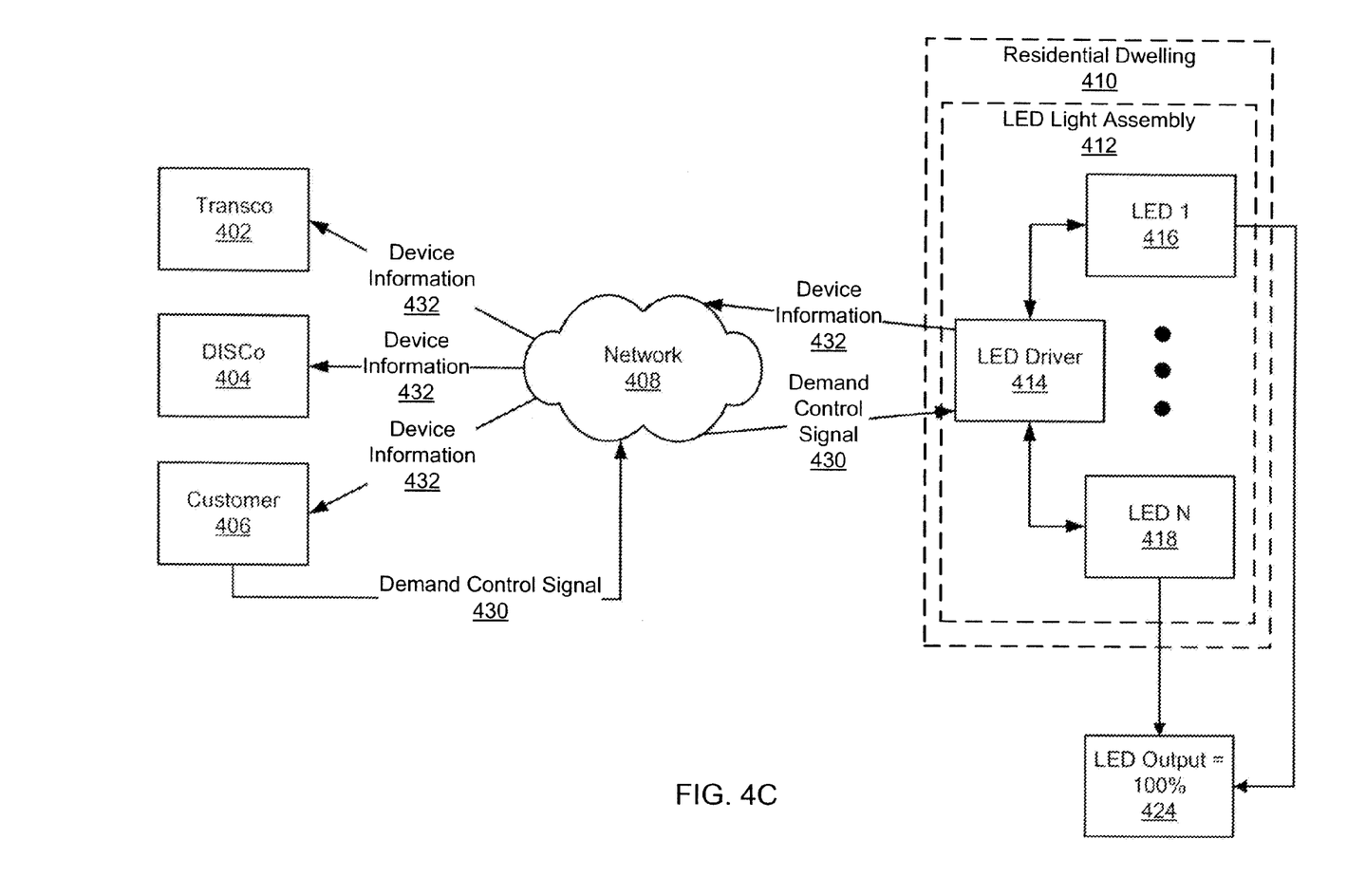

At some point later in time, as shown in FIG. 4C, the customer 406 sends a demand control signal 430 to the LED driver 414. The demand control signal 430 includes an instruction for the LED driver 414 to immediately turn on all of the LEDs (e.g., LED 1 416, LED N 418) so that the LED output=100% 424. In other words, the output setting of each LED is fully on. The demand control signal 430 may be sent by the customer 406 in one of a number of ways, including but not limited to using a mobile application, using a desktop computer, and flipping a wall switch. The demand control signal 430 may be sent by the customer 406 manually or automatically.

Continuing with FIG. 4C, after the LED driver 414 receives the demand control signal 430, processes the demand control signal 430, and immediately acts upon the instructions within the demand control signal 430, the LED driver 414 verifies that the LEDs output=100% 424, corresponding to the third energy level. The LED driver 414 may verify the LED output by using an internal meter that measures the energy level of one or more of the LEDs in the LED light assembly 412. Once the LED driver 414 verifies that the LED output=100% 424, the LED driver 414 sends device information 432 to all of the utilities (in this example, Transco 402, DISCo 404, and customer 406) using the network 408.

Figure 4D:
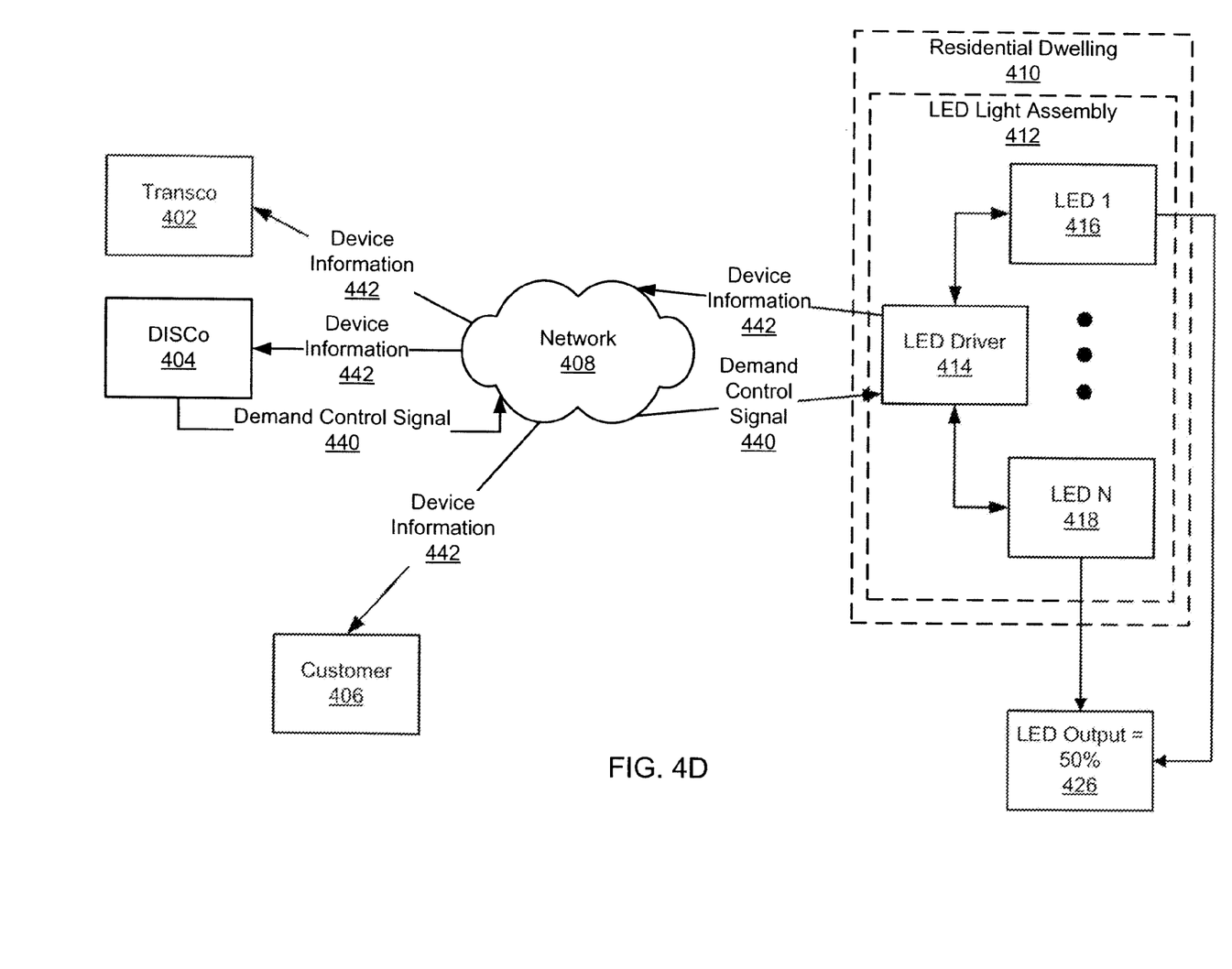

At some point subsequent in time, as shown in FIG. 4D, DISCo 404 sends a demand control signal 440 to the LED driver 414. The demand control signal 440 includes an instruction for the LED driver 414 to reduce the energy consumption of the LEDs (e.g., LED 1 416, LED N 418) so that the LED output=50% 426, corresponding to the second energy level. In this case, the demand control signal 440 also includes an instruction to reduce the energy consumption of the LEDs at 10:00 a.m. that day. The LED light assembly 412 is configured to execute this instruction under a time delay because of the "t" at the end of the model number.

According to the hierarchy established within the LED driver 414, the demand control signal 440 received from the DISCo 404 takes priority over the demand control signal 430 received from the customer 406. Consequently, at 10:00 a.m., the demand control signal 440 received from the DISCo 404 will be acted upon, and the demand control signal 430 received from the customer 406 will be ignored.

In one or more exemplary embodiments, a utility that is lower on the hierarchy of utilities may have its demand control signal recognized and the corresponding demand control command acted upon if the corresponding demand control command is complementary to, rather than contrary to, the demand control command received from the higher-ranking utility on the hierarchy of utilities. In this example, if the customer 406 requests the LED light assembly 412 to operate at 20% when, at the same time, the DISCo 404 requires the LED light assembly 412 to operate at 50%, then the request from the customer 406 is recognized because the request from the customer 406 is complementary to (i.e., requires even less energy usage than), and not contrary to, the command from the DISCo 404. However, if the customer 406 requests the LED light assembly 412 to operate at 70% when, at the same time, the DISCo 404 requires the LED light assembly 412 to operate at 50%, then the request from the customer 406 is ignored because the request from the customer 406 is contrary to (i.e., requires more energy usage than), and not complementary to, the command from the DISCo 404.

The demand control signal 440 may be sent by DISCo 404 in one of a number of ways, including but not limited to using demand control software, using a desktop computer, sending a text message, some other suitable means of sending the demand control signal 440, or any suitable combination thereof. The demand control signal 440 may be sent by DISCo 404 manually or automatically.

Continuing with FIG. 4D, after the LED driver 414 receives the demand control signal 440, processes the demand control signal 440, and acts upon the instructions (including the required start time) within the demand control signal 440, the LED driver 414 verifies that the LEDs output=50% 426. In this example, the LED driver 414 verifies the energy consumption of the LEDs at 10:00 a.m. The LED driver 414 may verify the LED output by using an internal meter that measures the energy level of one or more of the LEDs in the LED light assembly 412. Once the LED driver 414 verifies that the LED output=50% 426, the LED driver 414 sends device information 442 to all of the utilities (in this example, Transco 402, DISCo 404, and customer 406) using the network 408.

Figure 4E:
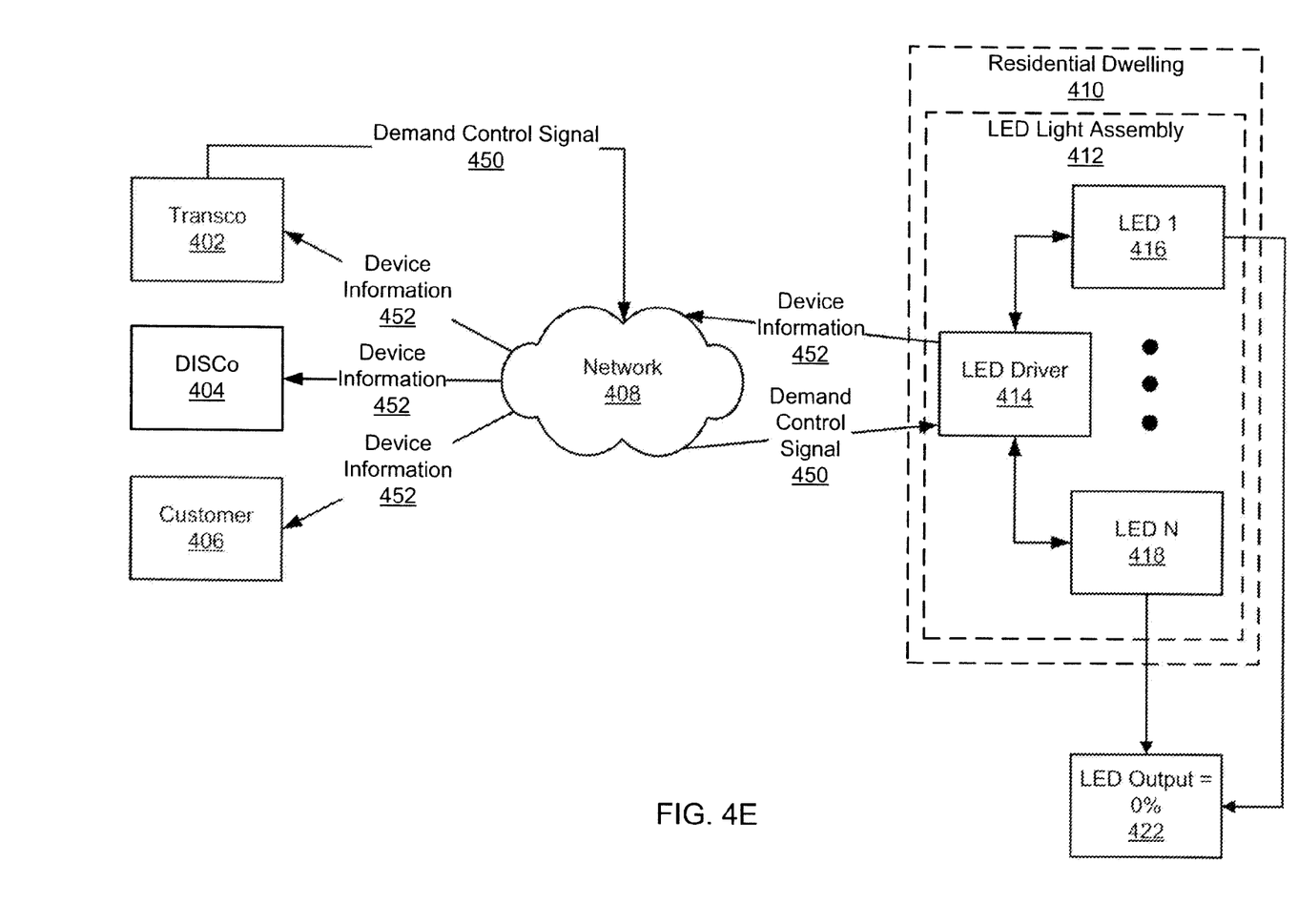

At some point after 10:00 a.m. that day, as shown in FIG. 4E, Transco 402 sends an emergency demand control signal 450 to the LED driver 414. The emergency demand control signal 450 includes an instruction for the LED driver 414 to immediately reduce the energy consumption of the LEDs (e.g., LED 1 416, LED N 418) so that the LED output=0% 422, corresponding to the first energy level. The emergency demand control signal 450 also includes an instruction that, effective at 7:00 p.m. that day, the emergency demand control signal 450 shall expire. In other words, at 7:00 p.m. that day, the energy level of the LEDs shall be determined by the active (e.g., not withdrawn or expired) demand response signal having the highest priority at that time.

According to the hierarchy established within the LED driver 414, emergency demand control signal 450 received from Transco 402 takes priority over the demand control signal 440 received from the DISCo 404 as well as the demand control signal 430 received from the customer 406. Consequently, when the emergency demand control signal 450 is received and processed, the emergency demand control signal 450 received from Transco 402 will be acted upon, and both the demand control signal 440 received from the DISCo 404 and the demand control signal 430 received from the customer 406 will be ignored.

The emergency demand control signal 450 may be sent by Transco 402 in one of a number of ways, including but not limited to using demand control software, using a desktop computer, sending a text message, some other suitable means of sending the emergency demand control signal 450, or any suitable combination thereof. The emergency demand control signal 450 may be sent by Transco 402 manually or automatically.

Continuing with FIG. 4E, after the LED driver 414 receives the emergency demand control signal 450, processes the emergency demand control signal 450, and acts upon the instructions (including the required start time) within the emergency demand control signal 450, the LED driver 414 verifies that the LEDs output=0% 422. The LED driver 414 may verify the LED output by using an internal meter that measures the energy level of one or more of the LEDs in the LED light assembly 412. Once the LED driver 414 verifies that the LED output=0% 422, the LED driver 414 sends device information 452 to all of the utilities (in this example, Transco 402, DISCo 404, and customer 406) using the network 408.

Figure 4F:
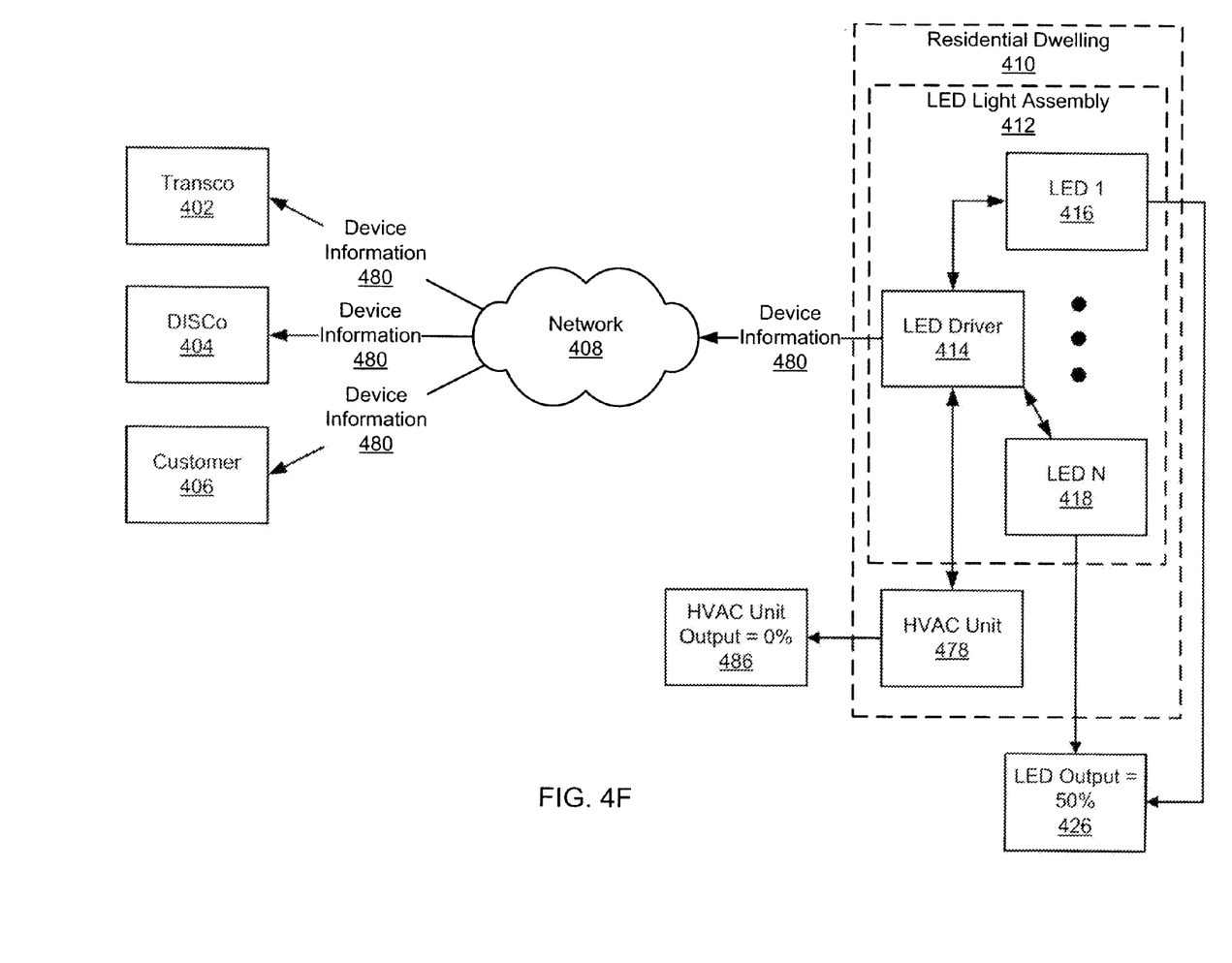

At some point after 7:00 p.m. that day, as shown in FIG. 4F, after the emergency demand control signal 450 has expired, the demand control signal 440 from DISCo 404 remains active, and so the LEDs output=50% 426. In addition, a HVAC unit 482 has been installed at the residential dwelling 410. As a result, the LED driver 414, which includes a controller that is configured to operate with devices external to the LED light assembly 412, establishes communication with the HVAC unit 482.

In so doing, the LED driver 414 may retrieve the device information 480 for the HVAC unit 482 and send the device information 480 to the utilities (in this example, Transco 402, DISCo 404, and customer 406) using the network 408. In addition, the LED driver 414 may control the energy level of the HVAC unit 482 based on signals received from one or more of the utilities. In this example, the LED driver 414 may control the energy level of the HVAC unit 482 by adjusting a thermostat in the residential dwelling 410. The LED driver 414 may also be configured to control an amount of gas delivered to the gas-fired heater of the HVAC unit 482 by controlling, for example, a gas valve that feeds the HVAC unit 482.

Those skilled in the art, having the benefit of this disclosure, will appreciate that other devices, using one or more types of energy (e.g., electricity, natural gas, propane, water), may be installed in the residential dwelling 410 in this example and controlled by the LED driver 412.

The exemplary embodiments discussed herein provide for more efficiently incorporating energy-consuming devices into a demand response or energy efficiency program. Specifically, the exemplary embodiments automatically synchronize with various devices, whether currently existing or newly installed. By synchronizing with the devices, the exemplary embodiments determine identifying information with regard to the devices, including energy level settings that were installed on the devices during manufacturing.

Further, the exemplary embodiments described herein provide for two-way communication with one or more utilities. The utilities may receive, using the exemplary embodiments, the identifying information with regard to the devices as well as verification information as to the current energy level of one or more of such devices. The utilities may also send, using exemplary embodiments, signals associated with demand response that are received, processed, and acted upon according to the instructions set out within the signals.

Using the exemplary embodiments described herein, incorporating and verifying performance of devices into a demand response program become immediate and do not require additional resources to perform. Specifically, the incorporation and auditing of energy-consuming devices, as well as the execution of demand response signals, are performed on a real-time basis by a single element or network of elements using the exemplary embodiments.

Although the invention is described with reference to exemplary embodiments, it should be appreciated by those skilled in the art that various modifications are well within the scope and spirit of this disclosure. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

We claim:

1. A method for adjusting energy consumption of a pre-programmed device operating at a first energy level, the method comprising:
   receiving, by a controller for the pre-programmed device, a first signal from a first utility, wherein the first signal comprises first instructions to adjust the energy consumption of the pre-programmed device to a second energy level, and wherein the pre-programmed device is programmed during manufacturing of the pre-programmed device to operate at the first energy level and the second energy level;
   receiving, by the controller for the pre-programmed device, a second signal from a customer, wherein the second signal comprises second instructions to instruct the pre-programmed device to operate at a non-second energy level different from the second energy level;
   processing, by the controller, the first signal to retrieve the first instructions and the second signal to retrieve the second instructions;
   adjusting, by the controller and based on the first instructions and the second instructions, an energy source from the first energy level to the second energy level when the second instructions of the customer contradict the first instructions of the first utility;
   adjusting, by the controller and based on the first instructions and the second instructions, the energy source from the first energy level to the non-second energy level when the second instructions of the customer complement the first instructions of the first utility; and
   sending a first notification from the controller to the first utility, wherein the first notification confirms that the pre-programmed device is operating at the second energy level when the second instructions of the customer contradict the first instructions of the first utility, and wherein the first notification confirms that the pre-programmed device is operating at the non-second energy level when the second instructions of the customer complement the first instructions of the first utility,
   wherein the first utility provides energy consumed by the pre-programmed device,
   wherein the first energy level, the second energy level, and the non-second energy level of the pre-programmed device are unalterable by the customer after the manufacturing,
   wherein the customer is unable to add an additional energy level to the pre-programmed device after the manufacturing.

2. The method of claim 1, wherein the second energy level is less than the first energy level.

3. The method of claim 1, wherein the pre-programmed device is a light fixture.

4. The method of claim 1, wherein the pre-programmed device is selected from a group consisting of heating, ventilation, and air conditioning (HVAC) system, a water heater, a washing machine, a dryer, a heating system, a refrigerator, a freezer, a computer, and a television.

5. The method of claim 1, wherein the pre-programmed device comprises a marketing designation that describes to the customer the first energy level and the second energy level at which the pre-programmed device is configured to operate.

6. The method of claim 5, wherein the marketing designation comprises a portion of a model number for the pre-programmed device.

7. The method of claim 1, wherein the second energy level is zero corresponding to turning off the pre-programmed device.

8. The method of claim 1, wherein the second energy level is less than a full energy level but greater than a zero energy level.

9. The method of claim 1, further comprising:
   receiving a third signal from the first utility, wherein the third signal comprises third instructions to adjust the energy source to the first energy level; and
   readjusting, in response to the third instructions, the energy source from the second energy level to the first energy level.

10. The method of claim 1, further comprising:
    receiving a third signal from a second utility, wherein the second utility ranks higher than the first utility on a hierarchy;
    processing the third signal, wherein the third signal comprises third instructions to adjust the energy consumption of the pre-programmed device to a fourth energy level, wherein the fourth energy level is programmed during the manufacturing of the pre-programmed device;
    adjusting, based on the third instructions, the energy source from the second energy level to the fourth energy level;
    ignoring, simultaneously with adjusting the energy source to the fourth energy level, the first instructions; and
    sending a second notification to the utility, wherein the second notification confirms that the pre-programmed device is operating at the fourth energy level.

11. The method of claim 10, wherein the first utility and the second utility use different communication protocols.

12. A non-transitory computer readable medium comprising computer readable program code embodied therein for performing a method of adjusting energy consumption in a pre-programmed device operating at a first energy level, the method comprising:
    receiving, by a controller for the pre-programmed device, a first signal from a utility, wherein the first signal comprises instructions to adjust the energy consumption of the pre-programmed device to a second energy level, and wherein the pre-programmed device is programmed during manufacturing of the pre-programmed device to operate at the first energy level and the second energy level;
    receiving, by the controller for the pre-programmed device, a second signal from a customer, wherein the second signal comprises second instructions to instruct the pre-programmed device to operate at non-second energy level different from the second energy level;
    processing, by the controller, the first signal to retrieve the first instructions and the second signal to retrieve the second instructions;

adjusting, by the controller and based on the first instructions and the second instructions, an energy source from the first energy level to the second energy level when the second instructions of the customer contradict the first instructions of the utility;

adjusting, by the controller and based on the first instructions and the second instructions, the energy source from the first energy level to the non-second energy level when the second instructions of the customer complement the first instructions of the utility; and sending a notification from the controller to the utility, wherein the notification confirms that the pre-programmed device is operating at the second energy level when the second instructions of the customer contradict the first instructions of the utility, and wherein the notification confirms that the pre-programmed device is operating at the non-second energy level when the second instructions of the customer complement the first instructions of the utility, wherein the utility provides energy consumed by the pre-programmed device, wherein the first energy level, the second energy level, and the non-second energy level of the pre-programmed device are unalterable by the customer after the manufacturing, wherein the customer is unable to add an additional energy level to the pre-programmed device after the manufacturing.

13. A light-emitting diode (LED) light assembly, comprising:
   at least one LED light source;
   a driver coupled to the at least one LED light source, wherein the driver has a plurality of pre-programmed settings, wherein each pre-programmed setting operates the at least one LED light source at an energy level, wherein the plurality of pre-programmed settings are pre-programmed when the driver is manufactured; and
   a controller operatively coupled to a utility and the driver, wherein the controller is configured to:
      receive a first signal from the utility, wherein the first signal comprises instructions to adjust energy consumed by the pre-programmed driver to a first energy level;
      receive a second signal from a customer, wherein the second signal comprises instructions to adjust the energy consumed by the pre-programmed driver to a second energy level;
      process the first signal to retrieve the first instructions and the second signal to retrieve the second instructions;
      determine, based on the first instructions, the second instructions, and the pre-programmed settings of the driver, a first amount of energy that corresponds to the first energy level when the second instructions contradict the first instructions;
      determine, based on the first instructions, the second instructions, and the pre-programmed settings of the driver, a second amount of energy that corresponds to the second energy level when the second instructions complement the first instructions;
      send the first amount of energy to the driver when the second instructions contradict the first instructions;
      send the second amount of energy to the driver when the second instructions complement the first instructions; and
      send a notification to the utility, wherein the notification confirms that the driver is operating at the first energy level when the second instructions contradict the first instructions, and wherein the notification confirms that the driver is operating at the second energy level when the second instructions complement the first instructions, wherein the utility provides energy consumed by the at least one LED light source,
   wherein the plurality of pre-programmed settings of the driver are unalterable by the customer after the driver is manufactured,
   wherein the customer is unable to add a pre-programmed setting to the driver after the manufacturing.

14. The LED light assembly of claim 13, wherein the driver and the controller are disposed in a housing.

15. The LED light assembly of claim 14, wherein the housing has disposed thereon a model number, wherein the model number comprises a summary of the pre-programmed settings.

16. The LED light assembly of claim 13, wherein the controller is further configured to:
   detect, upon installation, the driver;
   identify information associated with the driver; and
   send the information associated with the driver to the utility.

17. The LED light assembly of claim 13, wherein the controller is further configured to:
   detect an additional pre-programmed device coupled to the controller upon installation of the additional pre-programmed device;
   identify additional pre-programmed device information associated with the additional pre-programmed device; and
   send the additional pre-programmed device information associated with the additional pre-programmed device to the utility.

18. The LED light assembly of claim 17, wherein the controller is further configured to:
   receive a subsequent signal from the utility, wherein the subsequent signal comprises subsequent instructions to adjust the energy consumed by the driver and the additional pre-programmed device;
   process the subsequent signal to retrieve the subsequent instructions;
   determine a third amount of energy associated with an energy level of the subsequent instructions, wherein the third amount of energy is based on the subsequent instructions, the plurality of pre-programmed settings of the driver, and the additional pre-programmed device information associated with the additional pre-programmed device;
   send the third amount of energy to the driver and the additional pre-programmed device; and
   send a subsequent notification to the utility, wherein the subsequent notification confirms that the driver and the additional pre-programmed device are operating at the third energy level.

19. The LED light assembly of claim 13, wherein the controller communicates with a plurality of utilities, wherein the plurality of utilities comprises the utility and wherein each of the plurality of utilities uses different communication protocols when communicating with the controller.

20. The method of claim 1, wherein the first energy level and the second energy level are different from fully off.

* * * * *